(12) United States Patent
Okazaki

(10) Patent No.: US 7,835,735 B2
(45) Date of Patent: Nov. 16, 2010

(54) ROAMING-SERVICE-ENABLING SYSTEM, ROAMING-SERVICE-ENABLING METHOD AND ROAMING-SERVICE-ENABLING PROGRAM

(75) Inventor: Kenichi Okazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 1939 days.

(21) Appl. No.: 10/853,506

(22) Filed: May 26, 2004

(65) Prior Publication Data

US 2004/0242229 A1 Dec. 2, 2004

(30) Foreign Application Priority Data

May 30, 2003 (JP) .............................. 2003-154135

(51) Int. Cl.
*H04W 4/00* (2009.01)
(52) U.S. Cl. ................. 455/432.1; 455/435.2; 455/436; 370/331
(58) Field of Classification Search .................. 455/432, 455/100, 433, 414, 435, 432.2, 432.3, 432.1, 455/435.2, 436; 370/331
See application file for complete search history.

(56) References Cited

U.S. PATENT DOCUMENTS

| | | | |
|---|---|---|---|
| 6,161,008 A | | 12/2000 | Lee et al. |
| 6,453,162 B1 * | | 9/2002 | Gentry ....................... 455/433 |
| 6,470,378 B1 * | | 10/2002 | Tracton et al. .............. 709/203 |
| 7,260,638 B2 * | | 8/2007 | Crosbie ...................... 709/229 |
| 7,428,414 B2 * | | 9/2008 | Kumar et al. ............ 455/432.1 |
| 2002/0085719 A1 * | | 7/2002 | Crosbie ....................... 380/248 |
| 2002/0095498 A1 * | | 7/2002 | Chanda et al. .............. 709/225 |
| 2003/0054810 A1 | | 3/2003 | Chen et al. |
| 2003/0081617 A1 * | | 5/2003 | Deng .......................... 370/398 |
| 2004/0242229 A1 * | | 12/2004 | Okazaki .................. 455/432.1 |
| 2005/0002399 A1 * | | 1/2005 | Peterson .................... 370/392 |
| 2008/0200168 A1 * | | 8/2008 | Jiang ....................... 455/432.1 |

FOREIGN PATENT DOCUMENTS

| | | |
|---|---|---|
| JP | 11-136394 | 5/1999 |
| JP | 11-250009 | 9/1999 |
| JP | 2001-236288 | 8/2001 |
| JP | 2001-331409 | 11/2001 |
| JP | 2002-261761 | 9/2002 |
| JP | 2002-300311 | 10/2002 |
| WO | WO 02/103963 | 12/2002 |

\* cited by examiner

*Primary Examiner*—Nghi H Ly
(74) *Attorney, Agent, or Firm*—McGinn Intellectual Property Law Group, PLLC

(57) ABSTRACT

A roaming-service-enabling system is provided which enables a user to gain access to desired contents and/or to be provided with desired service from any kind of internet connecting device. An SRF (Service Roaming Framework) server has a network controlling unit, subscriber profile storing unit, and subscriber authenticating unit. The subscriber profile storing unit stores information about a type of an access terminal that a user is able to use and subscriber profile information used to identify an access unit corresponding to the access terminal. The network controlling unit transmits data fed from a service providing server to the access terminal by making the data be matched to the type of the access terminal and access unit according to subscriber profile information being stored by the subscriber profile storing unit.

20 Claims, 12 Drawing Sheets

ROAMING-SERVICE-ENABLING SYSTEM, ROAMING-SERVICE-ENABLING METHOD AND ROAMING-SERVICE-ENABLING PROGRAM

BACKGROUND OF THE INVENTION

1. Field of the Invention

The present invention relates to a roaming-service-enabling system, a roaming-service-enabling method and a roaming-service-enabling program to convert data received through the Internet depending on a type of a user terminal and of a transmission path to be used for access and to transmit the data to the user terminal.

The present application claims priority of Japanese Patent Application No. 2003-154135 filed on May 30, 2003, which is hereby incorporated by reference.

2. Description of the Related Art

In recent years, an infrastructure of a broadband network is built and service of receipt and transmission of electronic mail, browsing of a Web page, receipt of broadcasting or VoD (Video on Demand)-type contents, communications of a voice and/or a moving picture, or a like, by using IP (Internet Protocol) technology, is provided via an ADSL (Asymmetric Digital Subscriber Line) and/or access means such as a CATV (Cable Television) network, FTTH (Fiber to The Home) communication network, 3G (Third Generation) portable cellular phone communication network or a like. A user being provided with such the service (hereinafter simply called a "user") has come to have two or more sets obtained by combining internet the service (hereinafter simply called a "user") has come to have two or more sets obtained by combining internet connecting devices such as a home PC (Personal Computer), a portable cellular phone, a car-mounted ITS (Intelligent Transport System), or a like with an access means corresponding to the internet connecting device.

On the other hand, since there are some contents that are accessible from a PC but are not accessible from a portable cellular phone, a disadvantage occurs that the user wishing to view desired contents has to select an internet connecting device.

An internet roaming method is disclosed in, for example, Japanese Patent Application Laid-open No. 2002-261761 (Pages 4-10, FIG. 1) in which, when a terminal of a user is connected to a terminal of a non-contracted carrier being a carrier with whom the user has not signed a contract to receive service, subscriber information is exchanged between a contracted carrier being a carrier with whom the user has made a contract to receive service and the non-contracted carrier so that the non-contracted carrier can hold the subscriber information and, when the terminal of the user is again connected to the terminal of the non-contracted carrier, neither transmission nor receipt of the subscriber information between the contacted carrier and the non-contracted carrier is required.

Also, a roaming service system is disclosed in, for example, Japanese Patent Application Laid-open No. 2002-300311 (Pages 4-7, FIG. 1), in which, when a request for subscription of a user is received, connection is established between a cable television network and/or a public telephone network and a portable cellular phone.

However, since an object of the method disclosed in the Japanese Patent Application Laid-open No. 2002-261761 is to reduce an amount of data to be exchanged between the contracted carrier and non-contracted carrier, no consideration has been given to access from the internet connecting device of different kinds to contents.

Moreover, since an object of the method disclosed in the Japanese Patent Application Laid-open No. 2002-300311 is to establish connection between a cable television network and/or public telephone network and a portable cellular phone, no consideration has been given to a case in which a user uses a terminal of a PC or a like through an ADSL, FTTH, or a like.

Configurations of service connection for a user are described below. As shown in a schematic diagram shown in FIG. 9, a user 1 selects an access terminal, access means, mediator (for example, internet service providers (ISPs) who perform internet connecting service, ISP 10, ISP 11, ISP 12, and ISP 13), and service entities (SE) (SE 14, SE 15, SE 16, SE 17 being, for example, contents providing service, as shown in FIG. 9). However, the access terminal, access means, ISP, and SE are determined uniquely and the user 1 cannot select freely any combination of these. That is, as shown in FIG. 9, for the user 1 to gain access to each of the SE 14, SE 15, SE 16, and SE 17, only one route shown by a straight line in an up and down direction is available.

For example, there are some cases in which, if a PC, public telephone line, and ISP are used, specified contents can be accessed, however, it a portable cellular phone and a wireless telephone network are used, the specified contents cannot be accessed. However, in some cases, if an xDSL (x Digital Subscriber Line) or a wireless LAN (Local Area Network) is used as an access means, the user 1 can have freedom in selecting a combination of the access means and the ISP.

Moreover, in FIG. 9, as the access terminal, a home PC 2, portable cellular phone 3, car-mounted ITS terminal 4 and mobile PC 5 are shown as examples. Also, as the access means, an xDSL/CATV/FTTH 6 corresponding to the home PC 2, a wireless telephone network 7 corresponding to the portable cellular phone 3, an ITS 8 corresponding to the car-mounted. ITS terminal 4, and a WLAN (Wireless LAN) 9 corresponding to the mobile PC 5.

FIG. 10 is a diagram schematically showing a configuration of connection to be employed when service to cause a Web page to be displayed on an access terminal is provided at time of connection of the access terminal of the user 1 to the Internet 9. When service to display a Web page is to be given to the user 1, the user 1, even if using anyone of the access terminals, any one of the access means, and any one of the ISPs, by connecting to the Internet 19 through an IXC (Inter-Exchange Carrier) 18 or a like, can be provided with equal service. However, a Web page which can be browsed when a portable cellular phone 3 is used as the access terminal is limited to one that can correspond to a protocol stack such as a WAP (Wireless Application Protocol) or a like.

FIG. 11 is a diagram schematically showing a configuration of general connection to be employed when service (SE 20, SE 21, SE 22, and SE 23) to give an electronic mail account for transmitting and receiving electronic mail is provided for a user 1. An electronic mail account of the user 1 is assigned individually to each of the combination of the access terminal, access means, and ISP and is not unified. Therefore, the home PC2 and the portable cellular phone 3 cannot transmit or receive electronic mail by using the same electronic mail account or cannot change the ISP without changing the electronic mail account. Moreover, in some cases, the electronic mail account can be used through an IXC (not shown), other access means, and other ISP. For example, there is a case in which a server that realizes an electronic mail account of an ISP is accessed through a CATV. However, in such the case, since the user 1 accesses the server that realizes the electronic mail account using the Internet 19, a security problem is presented.

FIG. 12 is a diagram schematically showing a configuration of general connection to be employed when service to distribute contents of broadcasting and/or VoD-type moving pictures is provided for a user 1. In this case, contents that can be viewed are limited depending on combination sets of the access terminal, access means, and ISP selected by the user 1. That is, contents (SE 24, SE 25, SE 26, and SE 27) provided by one CSP (Contents Service Provider) cannot be viewed by two or more access terminals including, for example, a home PC and car-mounted ITS terminal 4, or a like, and if an ISP is changed to other ISP, contents provided by one CSP cannot be viewed. Moreover, in some cases, contents provided by the CSP can be viewed via an IXC (not shown), other access means and other ISP. For example, there is a case in which contents provided by the CSP corresponding to an arbitrary xDSL are viewed by a CATV. However, in such the case, since contents provided by the CSP are viewed via the Internet 19, service provided by the CSP is of a "best-effort-service" type and quality of service can not be ensured accordingly.

In addition to service described above, there is service called "roaming" which enables one service to be provided through other ISP. However, in such the service, as in the case in which subscriber right information is stored, in advance, in an SIM (Subscriber Identity Module) card used in, for example, a 3G portable cellular phone so that a telephone speech can be made even in a foreign country, limitation is imposed on an access terminal and access means. Moreover, due to dial-up connection, as in the case of service to connect the Internet which provides an access point for roaming to an electronic mail account, limitation is imposed on combinations of the access terminal, access means, and service providing contents.

SUMMARY OF THE INVENTION

In view of the above, it is an object of the present invention to provide a roaming-service-enabling system which is capable of causing a user to gain access to desired contents or to receive desired service from any kind of internet connecting device and, a roaming-service-enabling method a roaming-service-enabling program.

According to a first aspect of the present invention, there is provided a roaming-service-enabling system for giving an arbitrary service provided by a service providing server to two or more types of terminals being used by a user, the system including:

a roaming server including a profile storing unit to store information about the two or more types of terminals that the user is able to use and profile information to be used to identify a transmission path corresponding to each of the two or more types of terminals and a network controlling unit to transmit data fed from the service providing server to an arbitrary terminal selected among the two or more types of terminals, by matching the data to a type of the arbitrary terminal and to the corresponding transmission path according to the profile information being stored in the profile storing unit.

In the foregoing, a preferable mode is one wherein the roaming server has an authenticating unit to judge, by using information which is fed from the arbitrary terminal and is used for authentication, whether or not the user going to be provided with service by using the arbitrary terminal is qualified to be provided with service.

Also, a preferable mode is one wherein the arbitrary terminal that the user is able to use is connected to the Internet via a server in an internet service provider which provides internet connecting service and wherein the profile storing unit and network controlling unit are mounted in the server.

Also, a preferable mode is one wherein the service providing server is a server that issues an account of electronic-mail.

Also, a preferable mode is one wherein the service providing server is a contents distributing server.

Also, a preferable mode is one wherein the service providing server is a server which provides speech service using an internet protocol.

Also, a preferable mode is one wherein the network controlling unit converts a protocol that the service providing server uses to a protocol being matched to the arbitrary terminal and transmits data fed from the service providing server to the arbitrary terminal.

Furthermore, a preferable mode is one wherein the network controlling unit converts a descriptive language of data fed from the service providing server to a descriptive language being matched to the arbitrary terminal.

According to a second aspect of the present invention, there is provided a roaming-service-enabling method in a roaming server for giving an arbitrary service provided by a service providing server to two or more types of terminals being used by a user, the method including:

a step of storing information about the two or more types of terminals that a user is able to use and profile information to be used to identify a transmission path corresponding to each of the two or more types of terminals;

a step of judging, by using information which is fed from an arbitrary terminal selected among the two or more types of terminals and is used for authentication, whether or not the user going to be provided with service by using the arbitrary terminal is qualified to be provided with service; and a step of transmitting data fed from a service providing server to the arbitrary terminal, by matching the data to a type of the arbitrary terminal and to the corresponding transmission path according to the stored profile information.

According to a third aspect of the present invention, there is provided a roaming-service-enabling program installed in a roaming server for giving one service provided by a service providing server to two or more types of terminals being used by a user to have the roaming server execute processing, the processing including:

a process of storing information about the two or more types of terminals that a user is able to use and profile information to be used to identify a transmission path corresponding to each of the two or more types of terminals;

a process of judging, by using information which is fed from an arbitrary terminal selected among the two or more types of terminals and is used for authentication, whether or not the user going to be provided with service by using the arbitrary terminal is qualified to be provided with service; and a process of transmitting data fed from a service providing server to the arbitrary terminal, by matching the data to a type of the arbitrary terminal and to the corresponding transmission path according to the stored profile information.

With the above configuration, a user can be provided with same service via the Internet by using two or more different access terminals. Therefore, it is not necessary that, when a user wants to be provided with service, the user employs a different access terminal depending on a type of service, which serves to improve availability of service and to preclude redundancy of service.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

Figure 1:
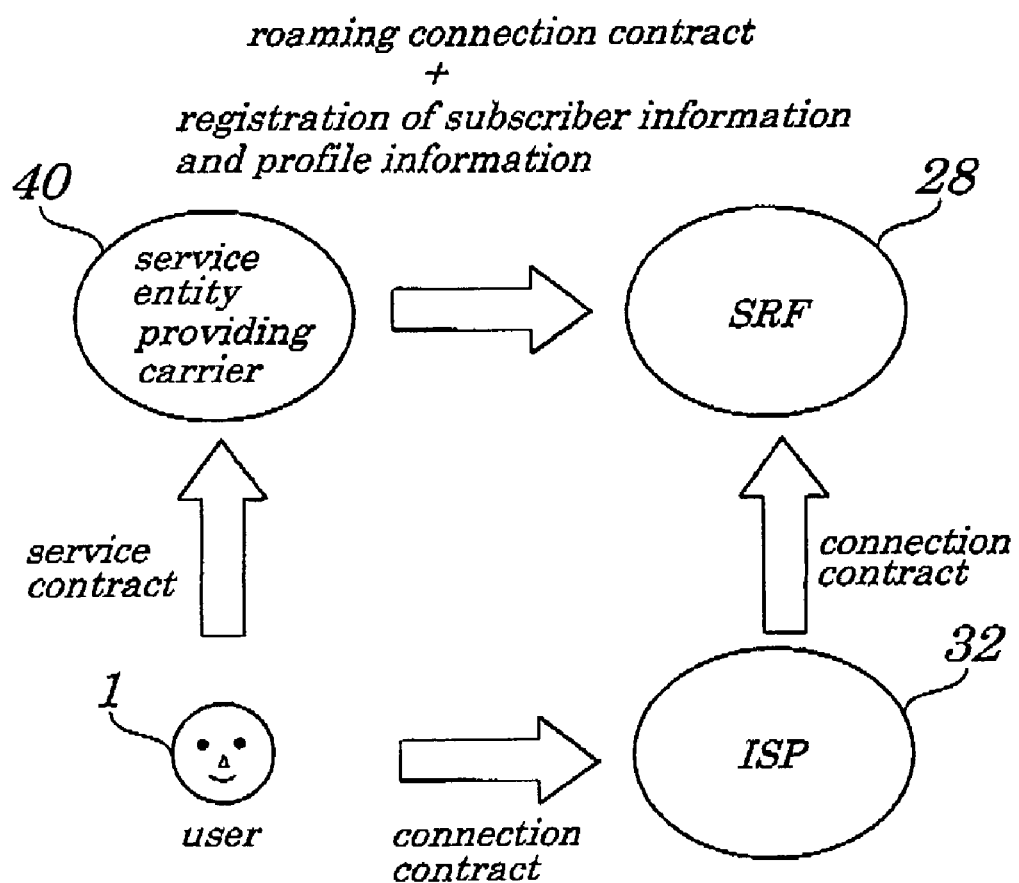
FIG. 1 is a diagram explaining a concept of the present invention.

FIG. 1 is a diagram explaining a concept of the present invention. As shown in FIG. 1, a user 1 signs a service contract with a service entity providing carrier 40 being a carrier to provide service entities and also signs an internet connecting contract with an ISP (internet service provider) 32. The service entity providing carrier 40, after having signed a roaming connection contract with an SRF (Service Roaming Framework) 28, transmits subscriber information and profile information to the SRF 28. Also, the ISP 32 signs a connection contract with the SRF 28. The "profile information" represents information about a type of an access terminal. When necessary, the profile information can contain detailed information about receiving capability of an access terminal and/ or information about a type of an access means.

The SRF 28 has a function of, when a combination of the access terminal and the access means is used, if the access terminal cannot download a Web page in a direct manner, downloading the Web page and supplying the Web page to the access terminal via the access means in a format that can match receiving capability of the access means. Moreover, the word "in a direct manner" means that information is transmitted directly from a Web server to an arbitrary access terminal via an access means corresponding to the access terminal and via the ISP 32.

For example, in the case where awe page exists which cannot be downloaded to a portable cellular phone 3 (FIGS. 2 and 3) due to reasons that an inapplicable protocol is used or the Web page is constructed of a descriptive language that cannot be processed by the portable cellular phone 3, when the portable cellular phone 3 tries to access the Web page, the Web page, after conversion of the protocol or conversion of the descriptive language, is transmitted to the portable cellular phone 3. Therefore, the SRF 28 has a function of, for example, making a conversion of a protocol and/or of a descriptive language. Moreover, the SRF 28 can be realized by using a computer. The SRF 28 may be also referred to as an "SRF server" (or "Roaming server") in some cases.

Figure 2:
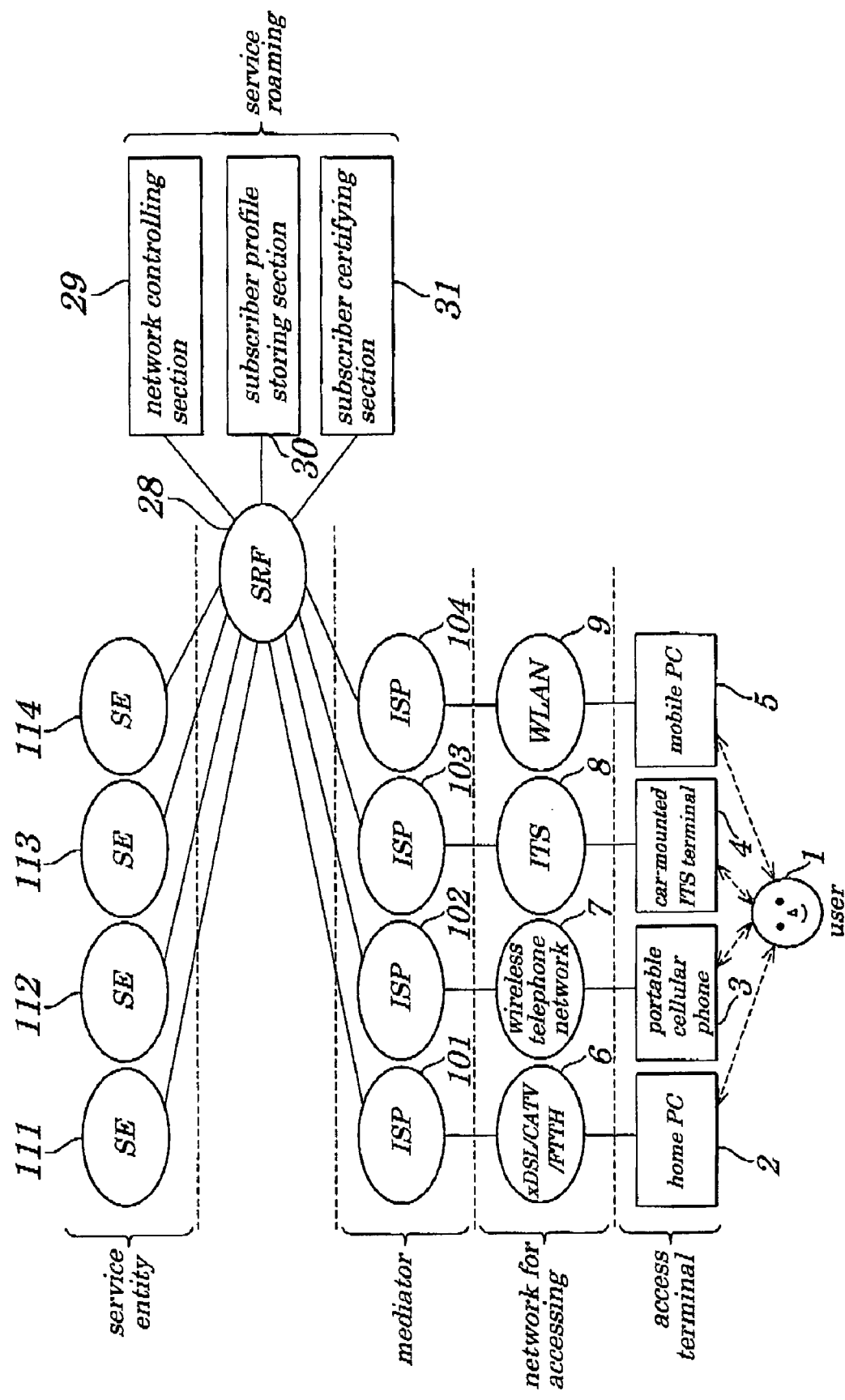
FIG. 2 is a diagram schematically showing an example of a configuration of a roaming-service-enabling system of the present invention.

FIG. 2 is a diagram schematically showing an example of a configuration of a roaming-service-enabling system of the present invention. As shown in FIG. 2, the SRF server 28 is mounted within the system and the SRF server 28 is able to transmit data to or to receive data from each server providing each of service entities SE 111, SE 112, SE 113, and SE 114. The service entities SE 111, SE 112, SE 113, and SE 114 are provided by service providing servers. Moreover, the SRF server 28 can transmit data to or to receive data from each of the ISP 101, ISP 102, ISP 103, and ISP 104. The SRF server 28 has a network controlling section (unit) 29, a subscriber profile storing section (device) 30, and a subscriber authenticating means (program) 31. The subscriber profile storing section 30 stores information about a type of an access terminal that can be used by the user 1 and a subscriber profile information being information used to identify an access means corresponding to the access terminal. The network controlling section 29 makes data fed from the service providing server be matched to a type of the access terminal and of the access means according to the subscriber profile information being stored in the subscriber profile storing section 30 and transmits the matched data to the access terminal. The subscriber authenticating section 31 judges whether or not a subscriber who is going to be provided with service entities SE 111, SE 112, SE 113, and SE 114 is qualified as a receiver of the service entities SE 111, SE 112, SE 113 and SE 114, by using information, which is transmitted from the access terminal, to be used for authentication.

Moreover, in each of embodiments described thereafter, the network controlling section 29 and the subscriber authenticating section 31 can be realized by software. Also, the SRF server 28 has a program used to perform processing to have the subscriber profile storing section 30 store subscriber profile information.

In FIG. 2, examples of the access terminal to be used by a user 1 are shown which include a home PC 2 placed at a home of the user 1, a portable cellular phone 3 having a web browser function, a car-mounted ITS terminal 4 placed in an automobile of the user 1, and a mobile PC 5 being a PDA (Personal Digital Assistant) having a communication function. The access means corresponding to the home PC 2 is, for example, an xDSL/CATV/FTTH 6. The access means corresponding to the portable cellular phone 3 is, for example, a wireless telephone network (wireless public line network) 7. The access means corresponding to the car-mounted ITS terminal 4 is, for example, an ITS 8. The access means corresponding to the mobile PC 5 is, for example, a WLAN (Wireless LAN) 9.

First Embodiment

Figure 3:
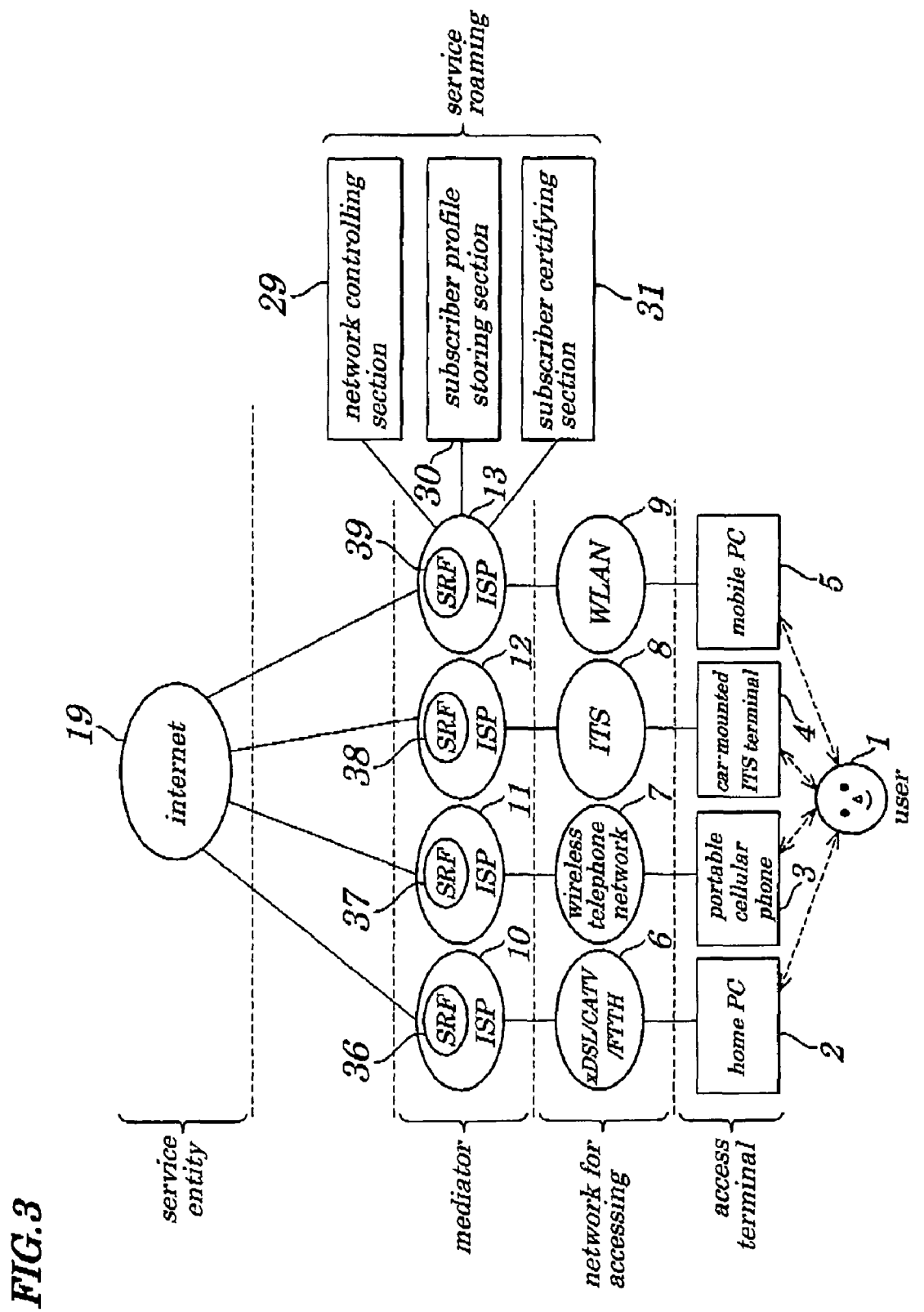
FIG. 3 is a block diagram schematically showing an example of the roaming-service-enabling system according to a first embodiment of the present invention.

FIG. 3 is a diagram schematically showing an example of the roaming-service-enabling system according to a first embodiment of the present invention. In the embodiment, each of SRF 36, SRF 37, SRF 38, and SRF 39 is installed in each server of ISP 10, ISP 11, ISP 12, and ISP 13. That is, the network controlling section 29, subscriber profile storing section 30, and subscriber authenticating section 31 are installed in each server of the ISP 10, ISP 11, ISP 12, and ISP 13.

As shown in FIG. 3, a user 1, by operating an access terminal, gets access to the service entity through an access means and a mediator. Let it be assumed that the user 1 has signed a contract to be connected to the Internet 19 via the xDSL/CATV/FTTH 6 and the ISP 10. Also, let it be assumed that the user 1 has signed a contract to be connected to the Internet 19 via the wireless telephone network 7 being a portable telephone communication network and the ISP 11. Let it be assumed that the user 1 has signed a contract to be connected to the Internet 19 via the ITS 8 and the ISP 12. Furthermore, let it be assumed that the user 1 has signed a contract to be connected to the Internet 19 via the WLAN 9 and the ISP 13.

In the system shown in FIG. 3, each of the SRF 36, SRF 37, SRF 38, and SRF 39 providing roaming service is realized by each server of the ISP 10, ISP 11, ISP 12, and ISP 13. Each server has the network controlling section 29 to control receipt and transmission of data, the subscriber profile storing section 30 to receive and store information about a subscriber, and the subscriber authenticating section 31 to perform subscriber authenticating processing of judging whether a user of connected terminals is a contractor. The information is subscriber information such as a registered ID (Identifier) of the ISP, registered ID of the SRF, password, or a like and profile information being information used to identify a type of the access terminal and of the access means. For example, the profile information to be registered on the SRF 37 includes information about an access means provided by which a wireless communication carrier is to be used or information about which type of the access means is to be used as the information to identify a type of the access terminal and of the access means.

Then, the SRF 36 signs, via the ISP 10, a contract for service roaming with the user 1 and, by converting data to be transmitted to the access terminal of the user 1 to a protocol corresponding to the access terminal and by controlling a transfer rate, transmits the above data to and receives it from the access terminal of the user 1. The SRF 37 signs, via the ISP 11, a contract for service roaming with the user 1 and, by converting data to be transmitted to the access terminal of the user 1 to a protocol corresponding to the access terminal and by controlling a transfer rate, transmits the above data to and receives it from the access terminal of the user 1. The SRF 38 signs, via the ISP 12, a contract for service roaming with the user 1 and, by converting data to be transmitted to the access terminal of the user 1 to a protocol corresponding to the access terminal and by controlling a transfer rate, transmits the above data to and receives it from the access terminal of the user 1. The SRF 39 signs, via the ISP 13, a contract for service roaming with the user 1 and, by converting data to be transmitted to the access terminal of the user 1 to a protocol corresponding to the access terminal and by controlling a transfer rate, transmits the above data to and receives it from the access terminal of the user 1.

Figure 4:
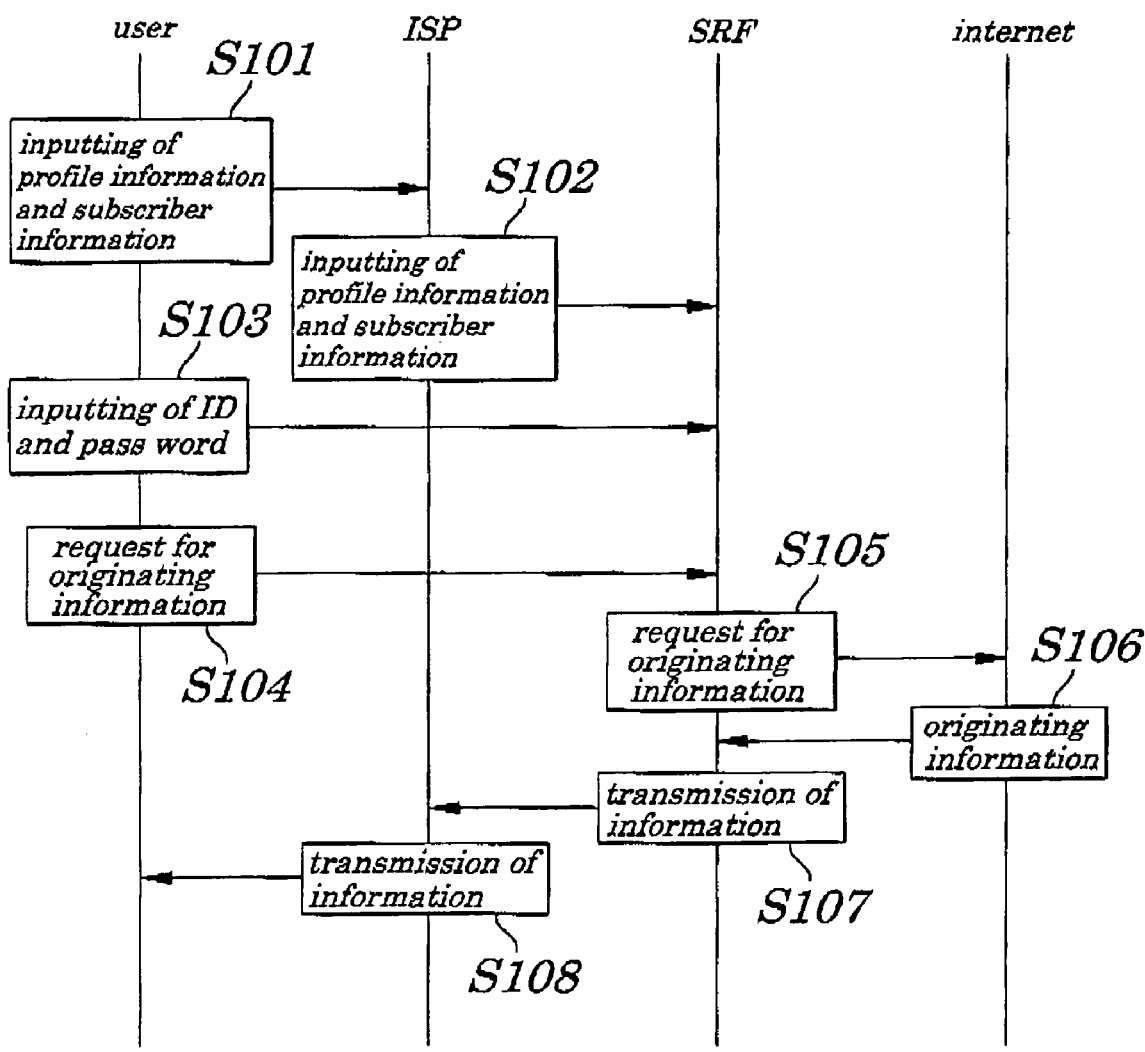
FIG. 4 is a sequence diagram showing operations of the roaming-service-enabling system according to the first embodiment of the present invention.

Next, operations of the roaming-service-enabling system are described by referring to FIG. 4. Here, an example in which the portable cellular phone 3 of the user 1 is connected to the Internet 19 is explained. FIG. 4 is a sequence diagram showing operations of the roaming-service-enabling system according to the first embodiment of the present invention.

The user 1 signs a contract to be provided with service to connect the portable cellular phone 3 of the user 1 via the wireless telephone network 7 to the Internet 19, with the ISP 11. Also, the user 1 signs a contract being provided a service of service roaming with the SRF 37. The ISP 11 may have a Web page to accept an input of information required for the SRF 37 to sign the contract. The user 1 inputs profile information and subscriber information being information used to identify the user 1 to the ISP 11 (Step S101). The ISP 11 outputs the input information to the SRF 37 (Step S102). The subscriber profile storing section 30 stores the input information.

When the user 1 browses a Web page by using the portable cellular phone 3, the subscriber authenticating section 31 makes a request of the user 1 for inputting a registered ID of the SRF and a pass word. The user 1 inputs the requested information to the SRF 37 (Step S103). The subscriber authenticating section 31 compares the input information with subscriber information being stored by the subscriber profile storing section 30 and performs subscriber authenticating processing of judging whether or not the user 1 is a contractor being qualified for being provided with service.

When the user 1 is confirmed to be a contractor being qualified for being provided with service, the subscriber authenticating section 31, based on profile information being stored by the subscriber profile storing section 30, identifies a protocol and transfer rate corresponding to the access terminal of the user 1. The user 1 inputs information making a request for transmission of information to one URL (Uniform Resource Locator) into the portable cellular phone 3. The portable cellular phone 3 transmits a request for originating information to the one URL to the SRF 37. The network controlling section 29 in the SRF 37, when receiving the request for originating information to one URL, which is transmitted from the portable cellular phone (Step S104) 3, transmits a request for originating information to a Web server for the one URL (Step S105).

The Web server for one URL transmits data, in response to a request for originating information from the portable cellular phone 3, to the SRF 37 (Step S106). The network controlling section 29 in the SRF 37, when receiving data transmitted from the Web server for one URL, converts the received data to a protocol specified by the subscriber authenticating section 31 and outputs the converted data to the portable cellular phone 3 via the ISP 11 at a transfer rate specified by the subscriber authenticating section 31 (Steps S107 and S108). More specifically, the network controlling section 29 converts subsets of a TCP (Transmission Control Protocol) and/or an HTML (Hyper Text Markup Language) so that the portable cellular phone 3 can receive the data. At this point, in some cases, character codes, image formats, and HTML tags are converted so that data can match receiving capability of the portable cellular phone 3.

Moreover, the network controlling section 29, when a Web page to be browsed by the user 1 is judged to correspond to a protocol stack of the portable cellular phone 3, as in the case of, for example, a WAP (Wireless Application Protocol), may make transmissions of a request for originating information fed from the portable cellular phone 3 to one URL and the transmissions of the data fed from the Web server for the one URL to the portable cellular phone 3 without the subscriber authenticating processing to be performed by the subscriber authenticating section 31.

As described above, according to the first embodiment of the present invention, it is made possible to browse a Web page described in a language that does not match receiving capability of the portable cellular phone 3 by using the portable cellular phone 3. Also, it is made possible to supply a Web page to be distributed by using a protocol or a like that does not match receiving capability of the portable cellular phone 3 to the portable cellular phone 3.

Moreover, in the embodiment, the case is explained in which the access terminal is the portable cellular phone 3 and the access means is the wireless telephone network 7. However, according to the present invention, even if an access terminal and access means other than described above are used, service of SE that can not be provided directly can be provided by having the SRF be mediated.

Second Embodiment

Figure 5:
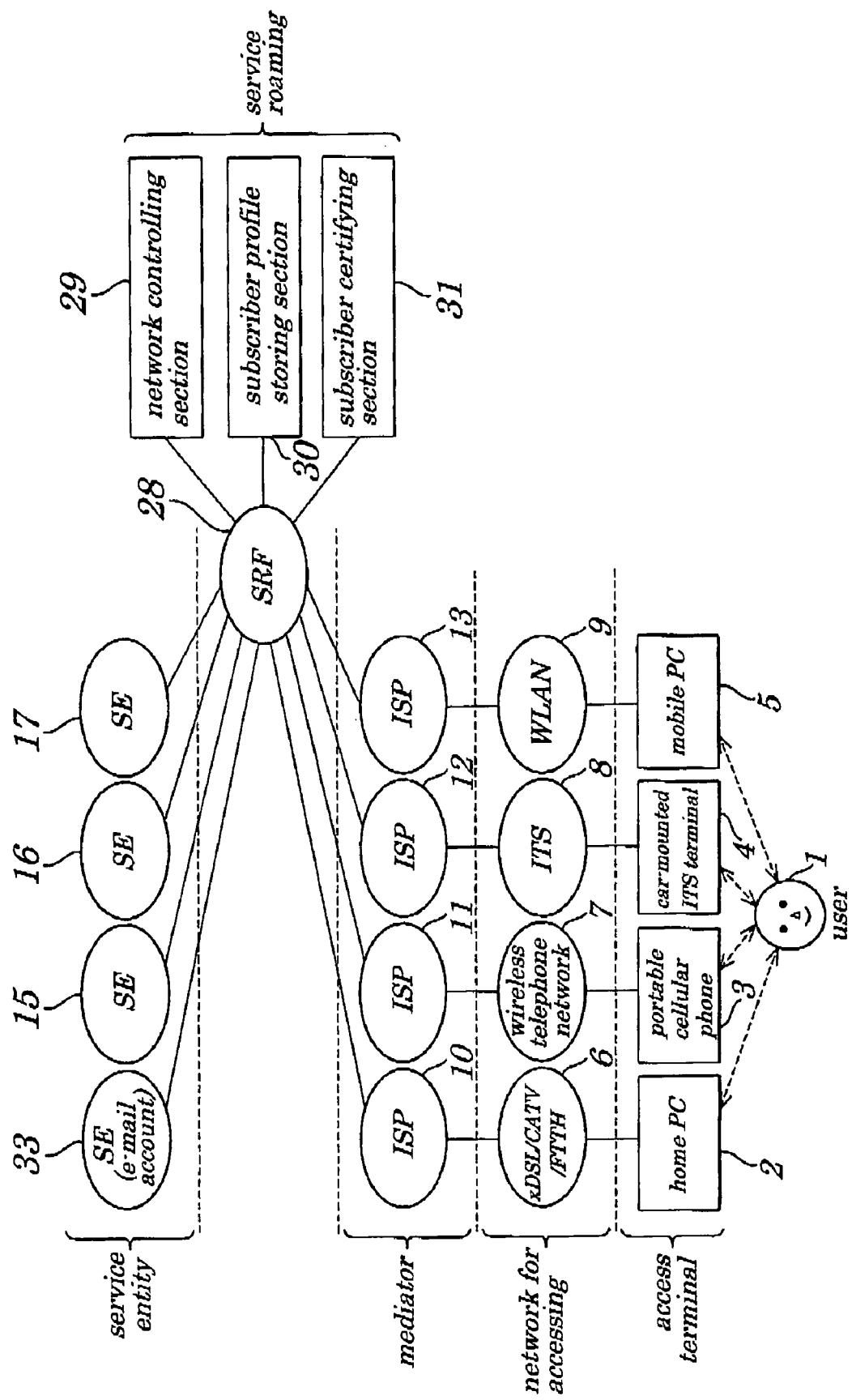
FIG. 5 is a block diagram schematically showing an example of a configuration of a roaming-service-enabling system according to a second embodiment of the present invention.

FIG. 5 is a block diagram schematically showing an example of a configuration of a roaming-service-enabling system according to a second embodiment of the present invention. In the embodiment, an SRF 28 is managed and operated independently of each ISP. A user 1 signs a contract to be provided with service via each access means and each ISP corresponding to each access terminal, with a service entity providing carrier. An SRF server 28 has a network controlling section 29, a subscriber profile storing section 30, and a subscriber authenticating section 31.

Figure 6:
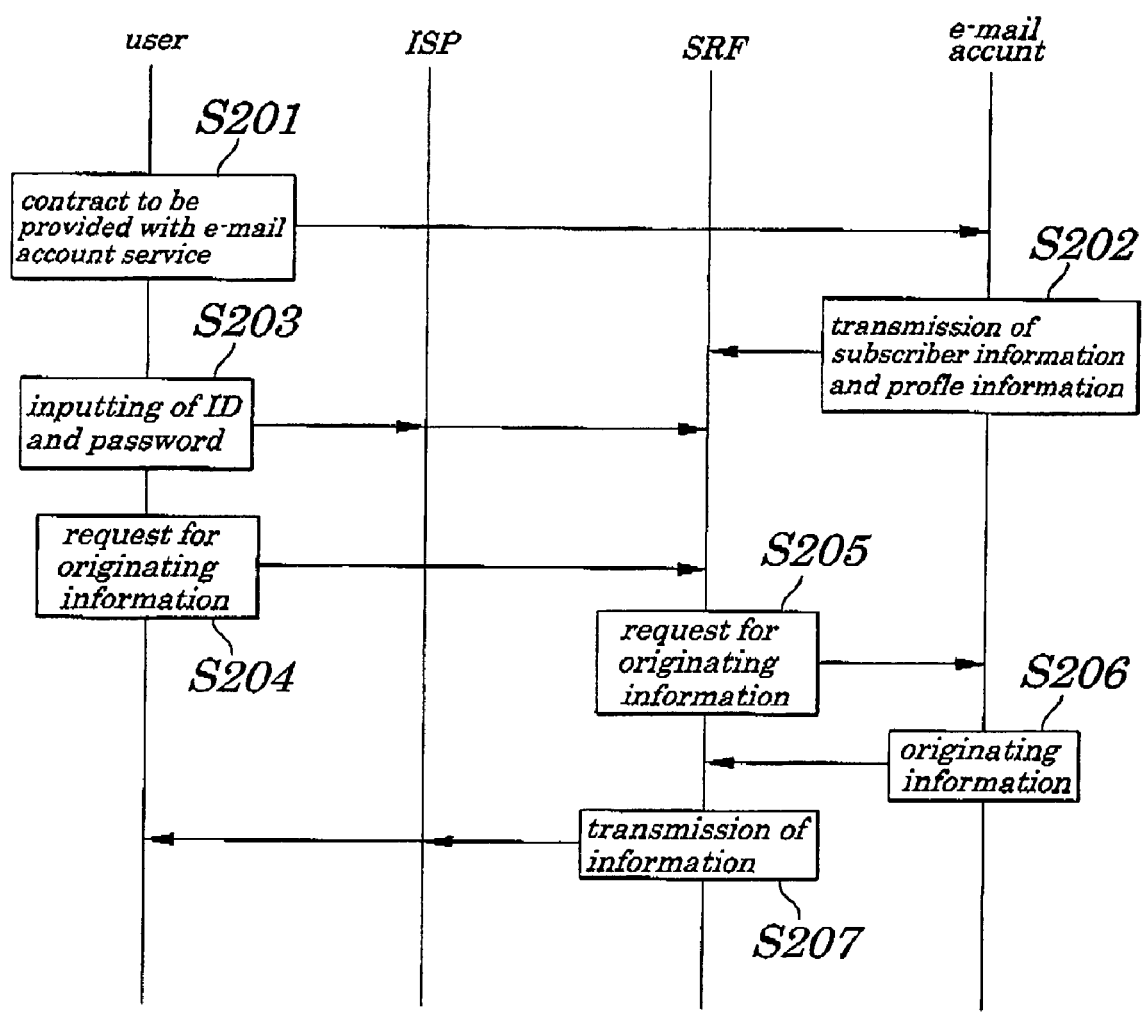
FIG. 6 is a sequence diagram showing operations of the roaming-service-enabling system according to the second embodiment of the present invention.

Next, operations of a roaming-service-enabling system are described by referring to the sequence diagram shown in FIG. 6. Here, an example case is explained in which a user 1 uses an e-mail account (SE33) through the Internet by using a portable cellular phone 3. FIG. 6 is a sequence diagram showing operations of the roaming-service-enabling system according to the second embodiment of the present invention. Now let it be assumed that a user 1 is in a position to be connected to a carrier providing an e-mail account, that is, a carrier having a mail server via an xDSL/CATV/FTTH6, and ISP10 by using a home PC. Hereinafter, a server possessed by a carrier providing service related to an e-mail amount is called an "e-mail account server". The e-mail account server contains a mail server function.

The user 1, by using the home PC 2 and xDSL/CATV/FTTH6, makes a request asking an e-mail account server to issue an e-mail account (Step S201). At this point, the user 1 transmits subscriber information and profile information to be used to identify an access terminal and an access means having a possibility of using an e-mail account, to the e-mail account server. The user 1 transmits, for example, profile information indicating types of the portable cellular phone 3 and of a wireless telephone network (communication carrier) and profile information indicating the home PC2 and the xDSL/CATV/FTTH6, together with subscriber information, to an e-mail account server. Then, the e-mail account server stores the received profile information. At this point, the profile information may contain information about a method for security maintenance (for example, IPse (IP Security Protocol), SOCKS, or a like), the number of characters that can be received, or a like.

The e-mail account server transmits the subscriber information and profile information, together with an e-mail account, to the SRF server 28 (Step S202). It is needless to say that the user 1 is also notified of the e-mail account. Also, the subscriber information contains an ID and a password for e-mail of the user 1. When the network controlling section 29 in the SRF server 28 receives subscriber information and profile information, the subscriber profile storing section 30 stores the received information. Moreover, by connecting an e-mail account server to the SRF server 28 using a VPN (Virtual Private Network) and by having the e-mail account server get access to the subscriber profile storing section 30 within an intranet containing the SRF server 28, the subscriber profile storing section 30 may be made to store subscriber information and profile information.

When the user 1 wishes to use e-mail via the portable cellular phone 3, the user 1 transmits, by using the portable cellular phone 3, an e-mail account, ID, and password to the ISP11 (Step S203). Then, the ISP11 transfers the received information to the SRF server 28. The subscriber authenticating section 31 in the SRF server 28 compares information fed from the user 1 with subscriber information being stored by the subscriber profile storing section 30 and performs subscriber authenticating processing to determine whether or not the subscriber authenticating section 31 provides service.

The subscriber authenticating section 31, when determining that it provides service, identifies a protocol, transfer rate, method for maintaining security which can match the access terminal of the user 1, based on profile information being stored by the subscriber profile storing section 30. Then, the network controlling section 29 receives a request for originating information (request for receiving e-mail) sent from the portable cellular phone 3 and transmits the received request to the e-mail account server (Step S204 and S205).

When the SRF server 28 receives data (e-mail addressed to the user 1) from the e-mail account server, the network controlling section 29 converts the received data to a protocol specified by the subscriber authenticating section 31 and by using a specified method for ensuring security, transmits the converted data via the ISP 11 at a specified rate to the portable cellular phone 3 (Step S206 and S207). For example, a protocol of a POP3 (Post Office Protocol 3) or IMAP (Internet Message Access Protocol) is converted to a protocol by which a portable cellular phone 3 can receive data. Moreover, the transmissions to the portable cellular phone 3 can be made in a manner in which the number of characters of data may be limited to a level at which a portable cellular phone 3 can receive and/or in a manner in which, if the data has an attachment, only the attachment that a portable cellular phone 3 can receive may be sent.

Here, an example is shown in which a user 1, by using a portable cellular phone 3, receives e-mail. However, the user 1, even when receiving e-mail by using a car-mounted ITS terminal 4 or a mobile PC5, can use a single e-mail account by having the SRF server 28 be mediated between the car-mounted ITS terminal 4 or the mobile PC5 and the e-mail account server. Moreover, not only in the case of receipt of e-mail but also in the case of transmission of e-mail, a single e-mail account can be used by having the SRF server 29 be mediated.

Thus, according to the second embodiment of the present invention, the user 1, by employing any one of the access terminals, can use a same e-mail account. Therefore, it is made possible to reduce the number of accounts of e-mail to be managed by the user 1. That is, it is not necessary that the user 1 obtains two or more e-mail accounts by an individual access terminal and, therefore, redundancy of service can be avoided. Moreover, by exerting control on a network by the server of the SRF 28, security of e-mail is ensured.

Third Embodiment

Figure 7:
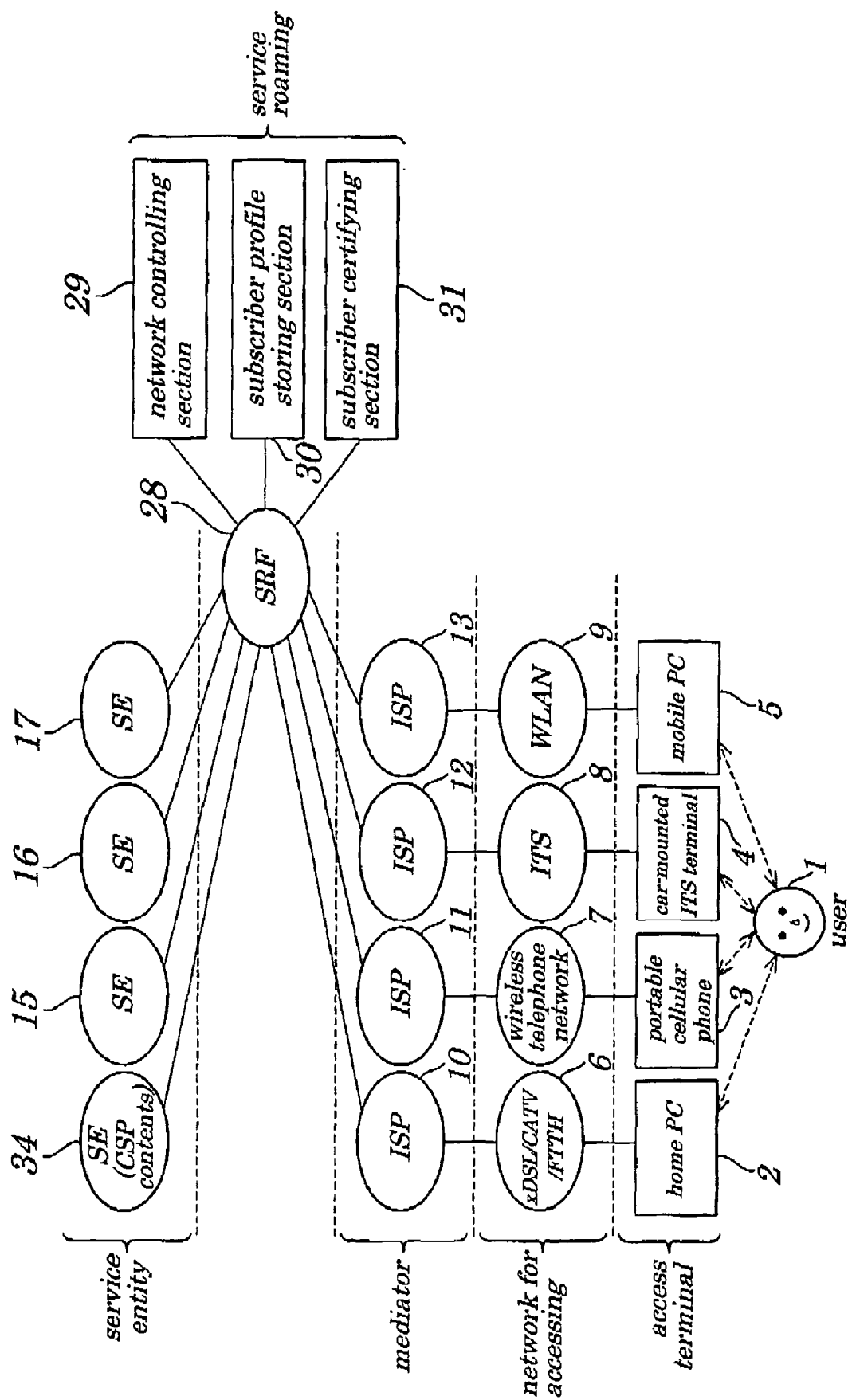
FIG. 7 is a diagram schematically showing a configuration of a roaming-service-enabling system according to a third embodiment of the present invention.

FIG. 7 is a diagram schematically showing a configuration of a roaming-service-enabling system according to a third embodiment of the present invention. In the embodiment, the user 1 signs a contract to be provided with service by having a home PC, xDSL/CATV/FTTH6, and ISP 10, with a CSP of moving picture contents (SE34). Hereinafter, a server (contents distributing server) possessed by a CSP of contents is called a "CSP server".

The user 1, when signing a contract to be provided with service by having the home PC 2, xDSL/CATV/FTTH6, and ISP 10 be mediated, transmits subscriber information and profile information to the CSP server. The CSP server transmits the subscriber information and profile information to the SRF server 28. Then, the subscriber profile storing section 30 in the SRF 28 stores the subscriber information and profile information.

Moreover, by connecting the CSP server to the SRF server 28 using a VPN (Virtual Private Network) and by having the SRF server 28 access the subscriber profile storing section 30 being placed within an intranet containing the SRF server 28, the subscriber profile storing section 30 may be made to store subscriber information and profile information.

The network controlling section 29, based on profile information being stored by the subscriber profile storing section 30, exerts band control, priority control, and transfer rate control (for example, conversion of a compression protocol).

The network controlling section 29, for example, when transmitting data received from the CSP server to the user 1, exerts band control to limit an amount of data that is sent to users other than the user 1. Also, the network controlling means 34 exerts priority control by which a packet of data received from the CSP server is transmitted to the user 1 by being given higher priority than a packet of data to be sent to users other than the user 1. Then, the network controlling section 29, based on profile information being stored by the subscriber profile storing section 30, specifies a transfer rate and a compression profile that can be received by the access terminal of the user 1 and converts data received from the CSP server to data having a transfer rate and a compression profile that the access terminal of the user 1 can receive. For example, when the access terminal of the user 1 is capable of receiving data having a format of MPEG 4 (Moving Picture Expert Group 4) with a transmission rate of 384 kbps or less, if the data received from the CSP server has a format of MPEG 2 with a transmission rate of 2 Mbps, the compression profile is converted to a format that the access terminal of the user 1 can receive.

The user 1, when signing a contract to be provided with service with a contents providing carrier, may sign a contract to limit types of contents to be distributed. In this case, the CSP server transmits information that types of contents to be distributed are limited to the SRF server 28. The subscriber profile storing section 30 stores the information that types of contents to be distributed are limited. The subscriber authenticating section 31, based on information being stored by the subscriber profile storing section 30, determines whether or not contents received from the CSP server are transmitted to the access terminal of the user 1.

Operations of the roaming-service-enabling system of the third embodiment differ from that of the second embodiment in that the network controlling section 29 exerts band control, priority control, transfer rate control based on profile information being stored by the subscriber profile storing section 30 and outputs contents to the portable cellular phone 3. However, other operations are the same as in the case of the second embodiment and, therefore, their descriptions are omitted.

According to the third embodiment, the user 1, even when using any one of the access terminals is used, is able to be provided with moving picture distributing service. Therefore, for example, even if contents are such that cannot be downloaded directly to the portable cellular phone 3, the contents can be downloaded by having the SRF server 28 be mediated.

Moreover, in the embodiment, an example is shown in which contents are downloaded to the portable cellular phone 3, however, even if contents are to be downloaded to other access terminal, by performing the processes of the embodiment described above, contents can be downloaded. Also, in the embodiment, an example is shown in which a moving picture is employed as contents, however, contents provided by the CSP are not limited to moving pictures.

Fourth Embodiment

Figure 8:
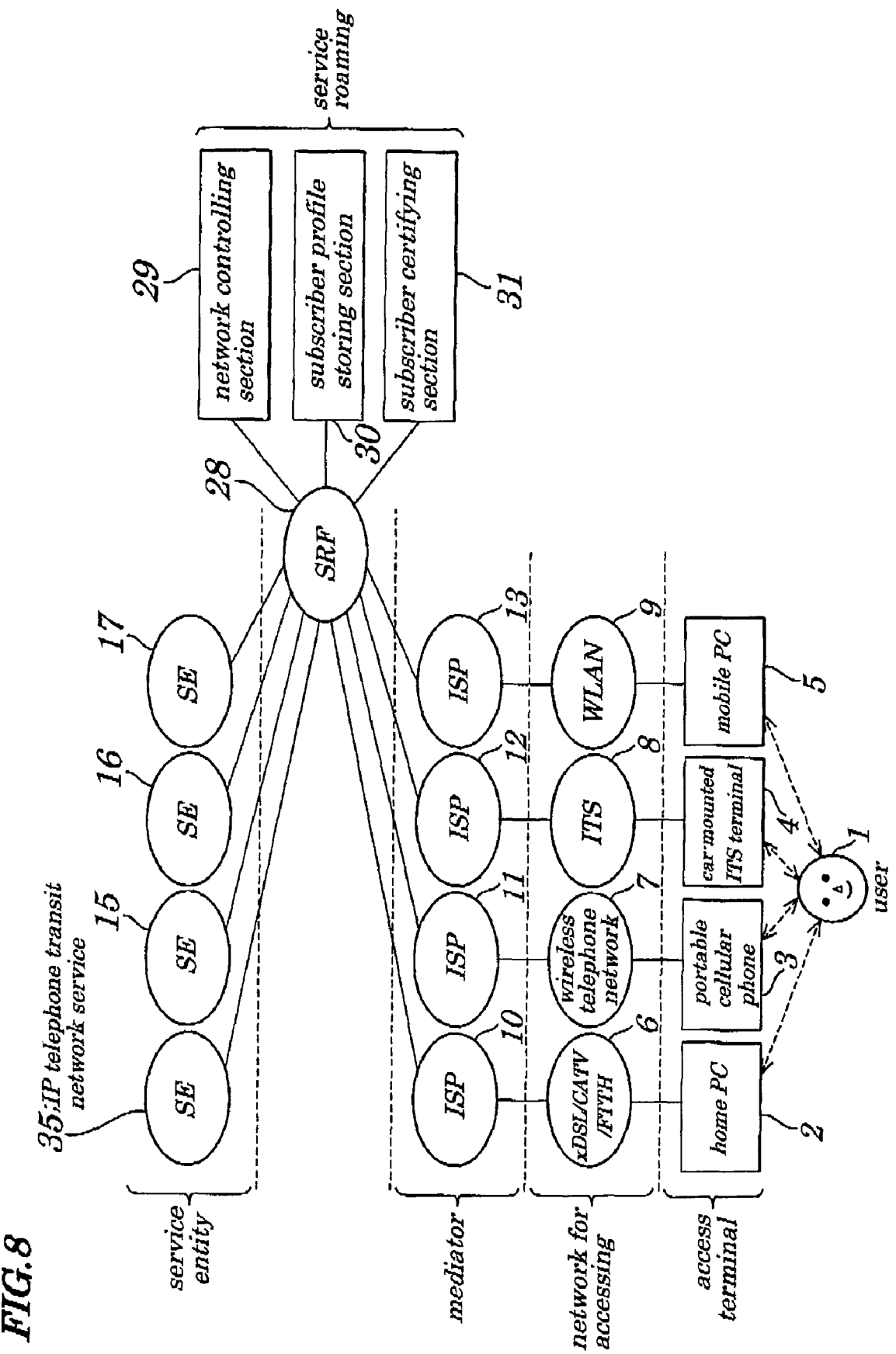
FIG. 8 is a diagram schematically showing a configuration of a roaming-service-enabling system according to a fourth embodiment of the present invention.
Figure 9:
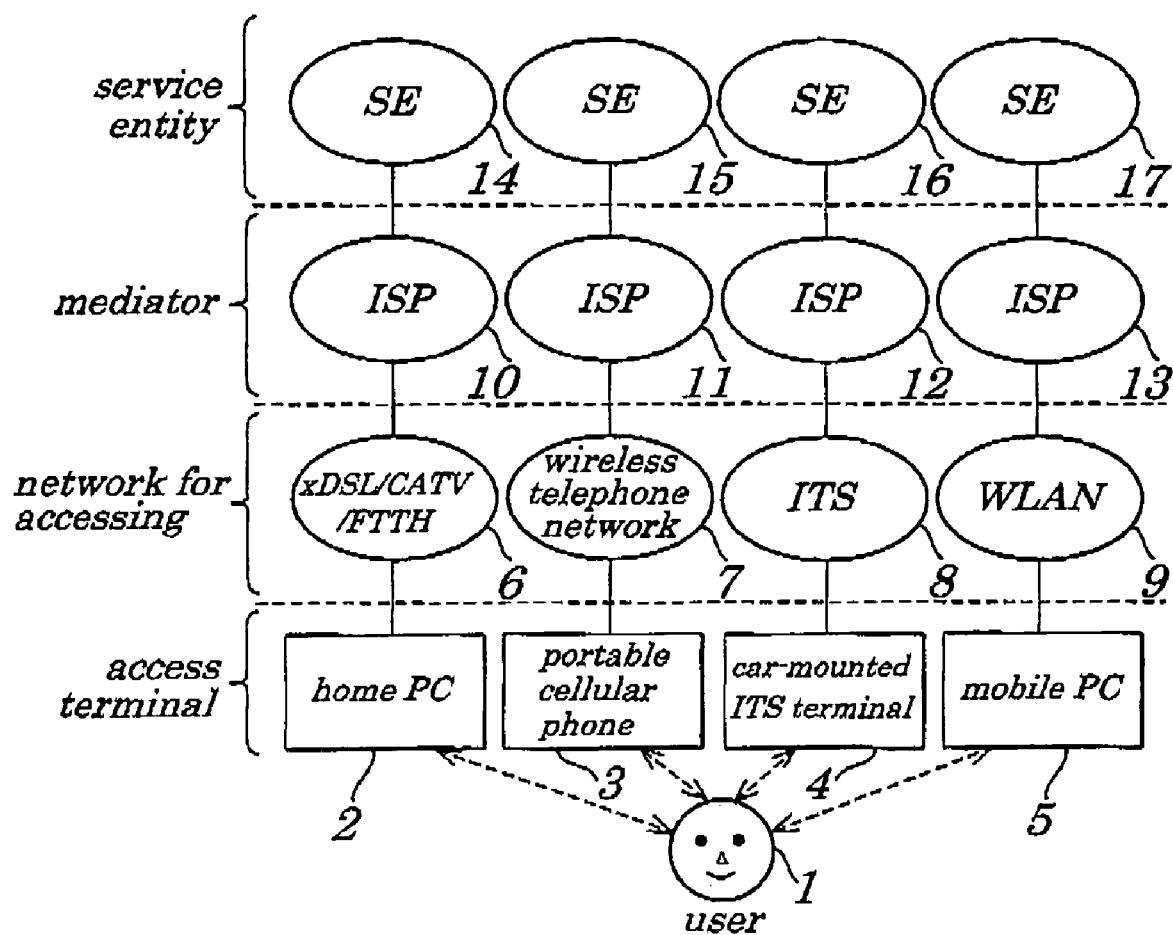
FIG. 9 is a diagram schematically showing a configuration of service connection for a general user.
Figure 10:
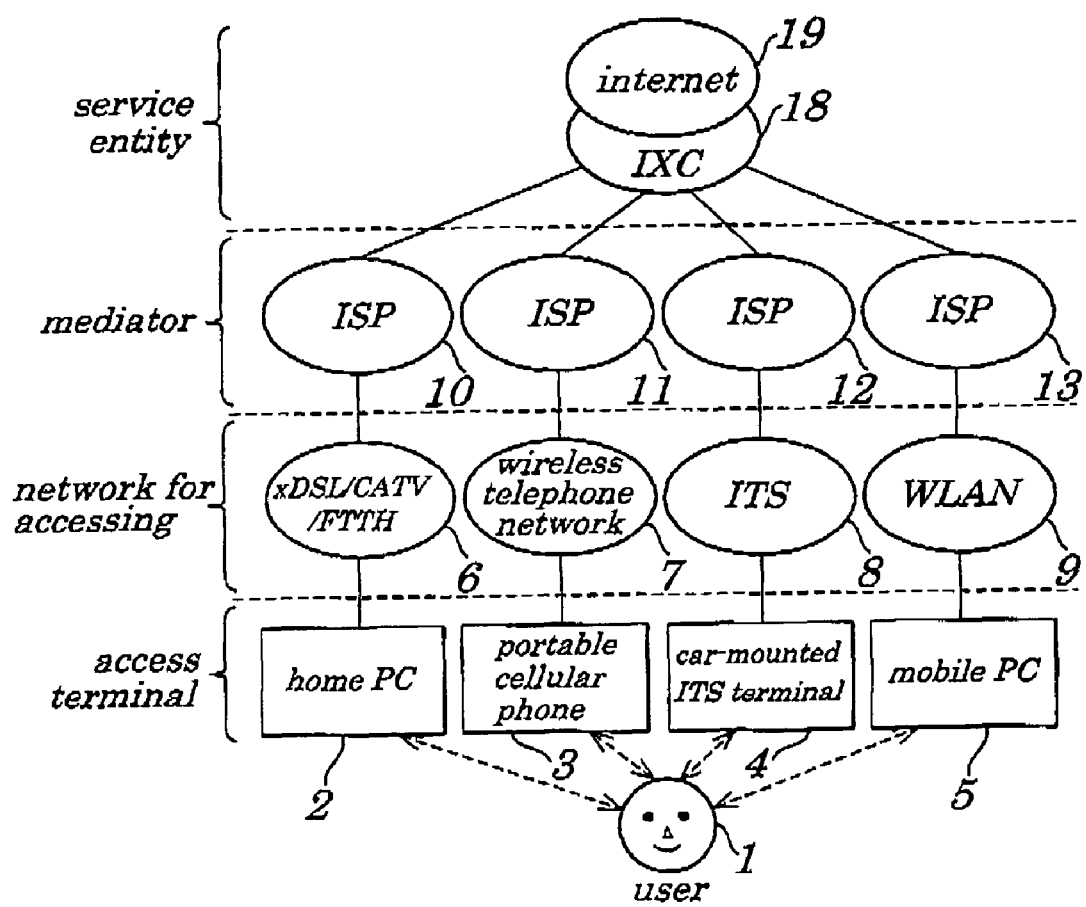
FIG. 10 is a diagram schematically showing a configuration of general connection to be employed when internet connecting service is provided.
Figure 11:
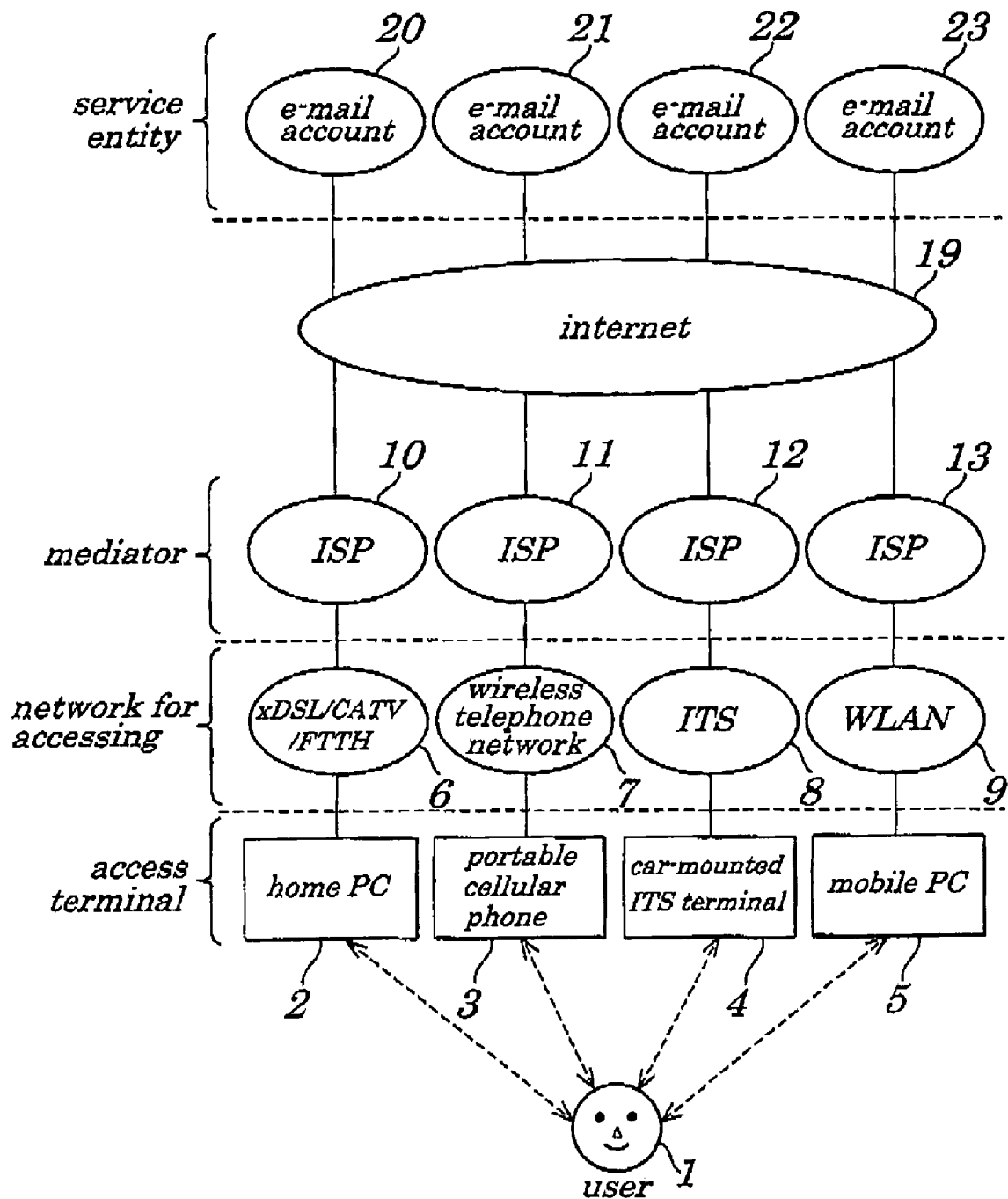
FIG. 11 is a diagram schematically showing a configuration of general connection to be employed when service to give an electronic mail account is given to a user.
Figure 12:
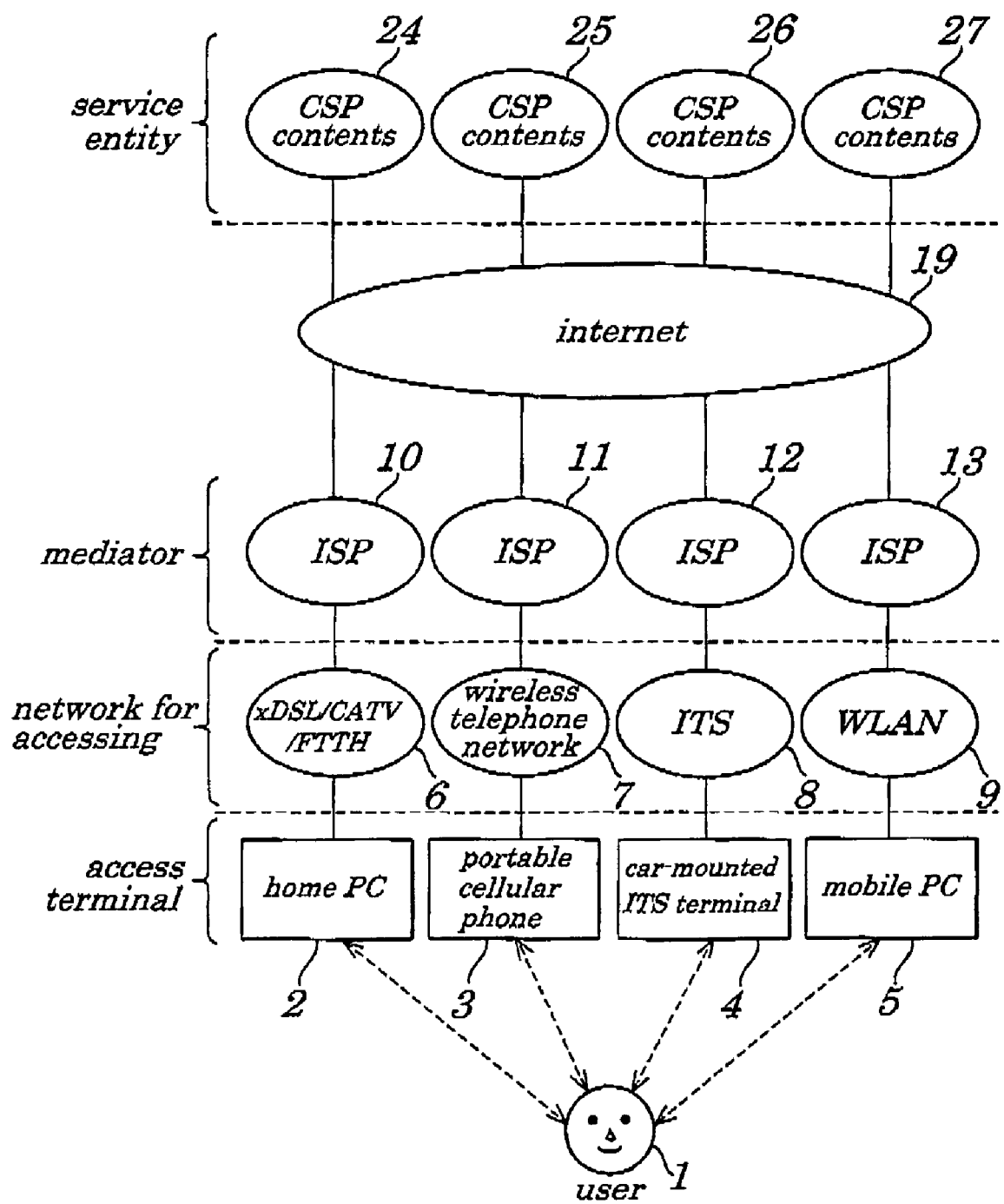
FIG. 12 is a diagram schematically showing a configuration of general connection to be employed when a CSP provides contents.

FIG. 8 is a diagram schematically showing a configuration of a roaming-service-enabling system according to a fourth embodiment of the present invention.

In the embodiment, the user 1, by using a home PC, signs a contract to be provided with service by having an xDSL/CATV/FTTH6 and ISP10 be mediated with a service provider who provides an IP telephone transit network service. Hereinafter, a server possessed by a provider of the IP telephone transit network service is called an IP telephone transit network server. The portable cellular phone 3 to be used in the embodiment has a function of converting a voice input to a microphone while a Web browser is operating to an IP packet and transmitting the converted IP packet which can be achieved by a specified operation of the user 1 and a function of converting a received IP packet to a voice signal and outputting a voice from the speaker which can be achieved also by the specified operation of the user 1.

In the embodiment, a network controlling section 29 in the SRF server 28, based on profile information being stored by a subscriber profile storing section 30, exerts band control, priority control, transfer rate control (for example, conversion of a compression profile). That is, the network controlling section 29, when transmitting, for example, data received from the IP telephone transit network server to the user 1, exerts band control by which an amount of data to be transmitted to a user other than the user 1 is controlled. Also, the network controlling means 34 exerts priority control by which a packet of data received from the IP telephone transit network server is transmitted to the user 1 by being given higher priority than a packet of data to be transmitted to a user other than the user 1. Then, the network controlling section 29, based on profile information being stored by the subscriber profile storing section 30, specifies a transfer rate and a compression profile that the access terminal of the user 1 can receive and converts data received from the IP telephone transit network server to data having a transfer rate and a compression profile that the access terminal of the user 1 can receive. Moreover, the SRF 28 has a Web page adapted to receive inputs of a registered ID to use the IP telephone transit network service, password, originating telephone number.

Next, operations of the roaming-service-enabling system of the fourth embodiment are described. The user 1, by using a home PC, signs a contract to use the IP telephone transit network service by having the xDSL/CATV/FTTH6, and ISP 10 be mediated with a provider of the IP telephone transit service. At this point, subscriber information and profile information are transmitted to the IP telephone transit network server. The IP telephone transit network server transits the subscriber information and profile information to the SRF server 28. The subscriber profile storing section 30 in the SRF server 28 stores subscriber information and profile information. The user 1, if there is a possibility that the user 1 uses the IP telephone transit network service via a portable cellular phone 3, transmits profile information indicating types of the portable cellular phone 3 and wireless telephone network (communication carrier) from a home PC 2 to the IP telephone transit network server. Moreover, by connecting the IP telephone transit network server to the SRF server 28 using a VPN and by having the IF telephone transit network server access the subscriber profile storing section 30 being placed within an intranet containing the SRF server 28, the subscriber profile storing section 30 may be made to store subscriber information and profile information.

The user 1, when using the IP telephone transit network service via the portable cellular phone 3, gets access, by using a Web browser function of the portable cellular phone 3, to a Web page which receives inputs of a registered ID possessed by the SRF server 28 to use the IP telephone transit network service, password, number used to identify a provider of the IP telephone transit network service, and telephone number of a receiver. Moreover, the Web page is provided by the SRF server 28. The subscriber authenticating section 31 in the SRF server 28, when receiving the information from the portable cellular phone 3, performs subscriber authenticating processing. When the subscriber authenticating section 31 judges the user 1 as a contractor of the IP telephone transit network service, the network controlling section 29 transmits the input number of the receiver to the IP telephone transit network service.

Then, when a voice is input into a microphone of the portable cellular phone 3 by a specified operation of the user 1, the portable cellular phone 3 converts the input voice to an IP packet and transmits it to the SRF 28. The network controlling section 29 in the SRF 28 receives an IP packet and transmits it to the IP telephone transit network server. The IP telephone transit network server transmits the received IP packet to a terminal having the number of the receiver via the IP telephone transit network.

The IP telephone transit network server, when receiving an IP packet with the portable cellular phone 3 designated as a receiver of data, transmits the IP packet to the portable cellular phone 3. At this point, band control, priority control, and transfer rate control based on the profile information described above are exerted. The portable cellular phone 3 converts the received IP packet to a voice signal and outputs a voice from a speaker.

The SRF 28 may set an access point being a predetermined telephone number that accepts the IP telephone transit network service. In this case, the user 1 originates a speech to an access point by using the portable cellular phone 3 and inputs, by operating a push button, a registered ID, password, number to specify the IP telephone transit network service, and telephone number of a receiver of the speech. Then, the subscriber authenticating section 31 performs subscriber authenticating processing. When the subscriber authenticating section 31 judges the user 1 as a contractor to be provided with the IP telephone transit network service, the network controlling section 29 transmits the input telephone number of the receiver of the speech to the IP telephone transit network server.

Then, when the portable cellular phone 3 converts a voice input to a microphone to a voice signal and transmits it to the SRF 28, the network controlling section 29 in the SRF 28 converts a voice signal to an IP packet and transmits it to the IP telephone transit network server. The IP telephone transit network server transmits the received IP packet to a terminal having a number of the receiver via the IP telephone transit network. The network controlling section 29 in the SRF server 28, when receiving an IP packet from the IP telephone transit network server, converts the IP packet to a voice signal and transmits it to the portable cellular phone 3. The portable cellular phone 3, when receiving a voice signal, outputs a voice through a speaker.

Here, an example is shown in which the user 1 is provided with the IP telephone transit network service via the portable cellular phone. However, the user 1, even when using other access terminal, by performing the same processing as described above, can be provided with the IP telephone transit network service.

Thus, according to the fourth embodiment, the user 1 can be provided with the IP telephone service by using any one of the access terminals.

It is apparent that the present invention is not limited to the above embodiments but may be changed and modified without departing from the scope and spirit of the invention.

What is claimed is:

1. A roaming-service-enabling system for giving an arbitrary service provided by a service providing server to two or more types of terminals being used by a user, said system comprising:

a roaming server comprising:
a profile storing unit to store terminal information about said two or more types of terminals that the user is able to use and profile information to be used to identify a transmission path corresponding to each of said two or more types of terminals; and
a network controlling unit to transmit data fed from said service providing server to an arbitrary terminal selected among said two or more types of terminals, said network controlling unit matching the data to a type of said arbitrary terminal and to the corresponding transmission path according to the profile information being stored in said profile storing unit.

2. The roaming-service-enabling system according to claim 1, wherein said service providing server comprises a contents distributing server.

3. The roaming-service-enabling system according to claim 1, wherein said network controlling unit converts a protocol that said service providing server uses to a protocol being matched to said arbitrary terminal and transmits data fed from said service providing server to said arbitrary terminal.

4. The roaming-service-enabling system according to claim 1, wherein said network controlling unit converts a descriptive language of data fed from said service providing server to a descriptive language being matched to said arbitrary terminal.

5. The roaming-service-enabling system according to claim 1, wherein said roaming server further comprises a programming unit for enabling the storing of said profile information in said profile storing unit.

6. The roaming-service-enabling system according to claim 1, wherein said two or more types of terminals comprise one of:

a personal computer;
a portable cellular phone having a Web browser;
a car-mounted Intelligent Transport System terminal placed in an automobile; and
a personal digital assistant having a communication function.

7. The roaming-service-enabling system according to claim 1, wherein said corresponding transmission path comprises one of:
a digital subscriber line;
a cable line;
a fiber optic line;
a wireless telephone network;
an intelligent transport system; and
a wireless local area network.

8. The roaming-service-enabling system according to claim 1, wherein said network controlling unit, based on said profile information being stored by said profile storing unit, exerts band control, priority control, and transfer rate control.

9. The roaming-service-enabling system according to claim 1, wherein said arbitrary terminal that the user is able to use is connected to the Internet via a server in an internet service provider which provides internet connecting service and wherein said profile storing unit and network controlling unit are mounted in said server.

10. The roaming-service-enabling system according to claim 6, wherein said network controlling unit converts subsets of a Transmission Control Protocol and a Hyper Text Markup Language such that said portable cellular phone can receive said data.

11. The roaming-service-enabling system according to claim 1, wherein said service providing server comprises a server that issues an account of electronic-mail.

12. The roaming-service-enabling system according to claim 11, wherein said server that issues said account of said electronic mail and said roaming server are connected by a Virtual Private Network, and
wherein said server that issues said account of said electronic mail has access to said profile storing unit within an intranet, said intranet comprising said roaming server.

13. The roaming-service-enabling system according to claim 1, wherein said service providing server comprises a server which provides speech service using an internet protocol.

14. The roaming-service-enabling system according to claim 13, wherein said network controlling unit converts a first voice signal to a first IP packet and transmits said first IP packet to said server which provides speech service using said interne protocol, and
wherein said network controlling unit, when receiving a second IP packet from said server which provides speech service using said internet protocol, converts said second IP packet to a second voice signal and transmits said second voice signal to a portable cellular phone.

15. The roaming-service-enabling system according to claim 1, wherein said roaming server further comprises:

an authenticating unit to judge, by using information which is fed from the arbitrary terminal and is used for authentication, whether the user going to be provided with service by using said arbitrary terminal is qualified to be provided with service.

16. The roaming-service-enabling system according to claim 15, wherein said networking controlling unit and said authenticating unit comprise software implemented units.

17. The roaming-service-enabling system according to claim 15, wherein the network controlling unit converts data received from a Web server to said type of said arbitrary terminal and outputs said converted data to said arbitrary terminal via an internet service provider, and
wherein said authenticating unit specifies said type of said arbitrary terminal and a transfer rate of an outputting of said converted data.

18. The roaming-service-enabling system according to claim 15, wherein said authenticating unit identifies a protocol, transfer rate, and method for maintaining security that matches said arbitrary terminal after determining whether the user going to be provided with service by using said arbitrary terminal is qualified to be provided with service.

19. A roaming-service-enabling method in a roaming server for giving an arbitrary service provided by a service providing server to two or more types of terminals being used by a user, said method comprising:
storing terminal information about said two or more types of terminals that a user is able to use and profile information to be used to identify a transmission path corresponding to each of said two or more types of terminals;
judging, by using information which is fed from an arbitrary terminal selected among said two or more types of terminals and used for authentication, whether the user going to be provided with service by using said arbitrary terminal is qualified to be provided with service; and
transmitting data fed from a service providing server to the arbitrary terminal, by matching the data to a type of said arbitrary terminal and to the corresponding transmission path according to the stored profile information.

20. A roaming-service-enabling program installed in a roaming server for giving one service provided by a service providing server to two or more types of terminals being used by a user to have said roaming server execute processing, said processing comprising:
storing terminal information about said two or more types of terminals that a user is able to use and profile information to be used to identify a transmission path corresponding to each of said two or more types of terminals;
judging, by using information which is fed from an arbitrary terminal selected among said two or more types of terminals and used for authentication, whether the user going to be provided with service by using said arbitrary terminal is qualified to be provided with service; and
transmitting data fed from a service providing server to the arbitrary terminal, by matching the data to a type of said arbitrary terminal and to the corresponding transmission path according to the stored profile information.

* * * * *